(12) United States Patent
Watanabe et al.

(10) Patent No.: US 12,071,263 B2
(45) Date of Patent: Aug. 27, 2024

(54) PROPELLER GUARD AND UNMANNED AERIAL VEHICLE

(71) Applicant: NIPPON TELEGRAPH AND TELEPHONE CORPORATION, Tokyo (JP)

(72) Inventors: Kazuaki Watanabe, Musashino (JP); Yujin Hamano, Musashino (JP); Daisuke Uchibori, Musashino (JP); Masafumi Nakagawa, Musashino (JP); Atsushi Aratake, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 126 days.

(21) Appl. No.: 17/906,503

(22) PCT Filed: Mar. 23, 2020

(86) PCT No.: PCT/JP2020/012739
§ 371 (c)(1),
(2) Date: Sep. 16, 2022

(87) PCT Pub. No.: WO2021/191974
PCT Pub. Date: Sep. 30, 2021

(65) Prior Publication Data
US 2023/0110109 A1    Apr. 13, 2023

(51) Int. Cl.
*B64U 30/299*    (2023.01)
*B64C 25/54*    (2006.01)
(Continued)

(52) U.S. Cl.
CPC ............ *B64U 30/299* (2023.01); *B64C 25/54* (2013.01); *B64C 39/024* (2013.01); *B64U 20/80* (2023.01); *B64U 60/10* (2023.01); *B64U 60/70* (2023.01)

(58) Field of Classification Search
CPC ...... B64U 30/299; B64U 60/70; B64U 60/10; B64C 25/54
See application file for complete search history.

(56) References Cited

U.S. PATENT DOCUMENTS 5,071,383 A * 12/1991 Kinoshita .............. B64U 30/24
244/30
2018/0370640 A1    12/2018 Toyama et al.
(Continued)

FOREIGN PATENT DOCUMENTS

DE        10023269 A1 * 11/2001 ............... B64B 1/06
KR     102296360 B1 *  9/2021
(Continued)

OTHER PUBLICATIONS

Apr. 14, 2020, International Search Report issued in the International Patent Application No. PCT/JP2020/012739.
(Continued)

*Primary Examiner* — Christopher P Ellis
(74) *Attorney, Agent, or Firm* — XSENSUS LLP

(57) ABSTRACT

A propeller guard (200) according to the present disclosure is a propeller guard (200) for an unmanned aerial vehicle including a main body part (1) and a propeller part (2) and includes: an encircling part (210) that extends around the propeller part (2) and protects the propeller part (2); and a connection part (220) that connects the main body part (1) and the encircling part (210), wherein the encircling part (210) has a buoyant force for maintaining at least a part of the main body part (1) and the propeller part (2) above water.

14 Claims, 13 Drawing Sheets

(51) Int. Cl.
*B64C 39/02* (2023.01)
*B64U 20/80* (2023.01)
*B64U 60/10* (2023.01)
*B64U 60/70* (2023.01)

(56) References Cited

U.S. PATENT DOCUMENTS

2020/0010193 A1* 1/2020 Alexander ............ B64C 39/024
2023/0150625 A1* 5/2023 Moses .................... B64D 47/08
244/17.23

FOREIGN PATENT DOCUMENTS

| WO | WO-0032469 A1 * | 6/2000 | ............... B64B 1/06 |
| WO | WO-2005032939 A1 * | 4/2005 | ............. B64C 27/20 |
| WO | 2017154552 A1 | 9/2017 | |
| WO | WO-2021191974 A1 * | 9/2021 | ............. B64C 25/54 |
| WO | WO-2022034681 A1 * | 2/2022 | |

OTHER PUBLICATIONS www.kickstarter.com, Retrieved on Jan. 10, 2020, from URL: https://www.kickstarter.com/projects/dronerafts/waterstrider-perfect-footage-confident-landings-an.

* cited by examiner

PROPELLER GUARD AND UNMANNED AERIAL VEHICLE

TECHNICAL FIELD

The present disclosure relates to a propeller guard and an unmanned aerial vehicle.

BACKGROUND ART

Conventionally, it has been considered to utilize unmanned aerial vehicles in various locations, and there has been a demand for multifunctional unmanned aerial vehicles. For example, a method using a self-flying unmanned aerial vehicle for inspecting manholes for communication has been considered. However, water is often pooled in manholes for communication. As a conventional technique, there is known an unmanned aerial vehicle equipped with a floating function for enabling takeoff and landing on the water so as to utilize the unmanned aerial vehicle not only on the ground but also on the water (for example, see Non Patent Literature 1).

CITATION LIST

Non Patent Literature

[NPL 1] kickstarter, "WaterStrider: Perfect Footage. Confident Landings. Anywhere.", [online], [searched on Mar. 6, 2020], Internet <URL:https://www.kickstarter.com/projects/dronerafts/waterstri der-perfect-footage-confident-landings-an>

SUMMARY OF THE INVENTION

Technical Problem

However, the unmanned aerial vehicle with conventional art has an issue of payload restrictions, in which the weight of a functional unit itself for floating the unmanned aerial vehicle on the water becomes large, which results in limiting the weight of other load such as a camera. In particular, the smaller the unmanned aerial vehicle is, the smaller the payload of the unmanned aerial vehicle becomes. Further, it is important to have a safety function to protect surrounding objects and people from propellers of the unmanned aerial vehicle rotating ata highspeed. Therefore, there has been a demand for the development of an unmanned aerial vehicle that is capable of taking off and landing on the water while ensuring the payload needed and that is also equipped with a safety function to protect surrounding objects and people from the propellers rotating at a high speed.

With the foregoing in view, it is an object of the present disclosure to provide a propeller guard and an unmanned aerial vehicle that can easily secure a payload, while providing the unmanned aerial vehicle capable of taking off and landing on the water with a safety function of protecting surrounding objects and people from propellers rotating at a high speed.

Means for Solving the Problem

A propeller guard according to one embodiment is a buoyant propeller guard for an unmanned aerial vehicle including a main body part and a propeller part and includes: an encircling part that extends around the unmanned aerial vehicle and protects the propeller part; and a connection part that connects the unmanned aerial vehicle and the encircling part, wherein the encircling part has a buoyant force for maintaining at least a part of the main body part and the propeller part above water.

An unmanned aerial vehicle according to one embodiment includes: the propeller guard described above; and a water landing sensor that is disposed on a lower portion of the main body part and detects that the main body part comes into contact with a water surface.

Effects of the Invention

According to the present disclosure, it is possible to provide a propeller guard and an unmanned aerial vehicle that can easily secure a payload, while providing the unmanned aerial vehicle capable of taking off and landing on the water with a safety function of protecting surrounding objects and people from propellers rotating at a high speed so that no payload restrictions will be needed.

DESCRIPTION OF EMBODIMENTS

Embodiment 1

Figure 1:
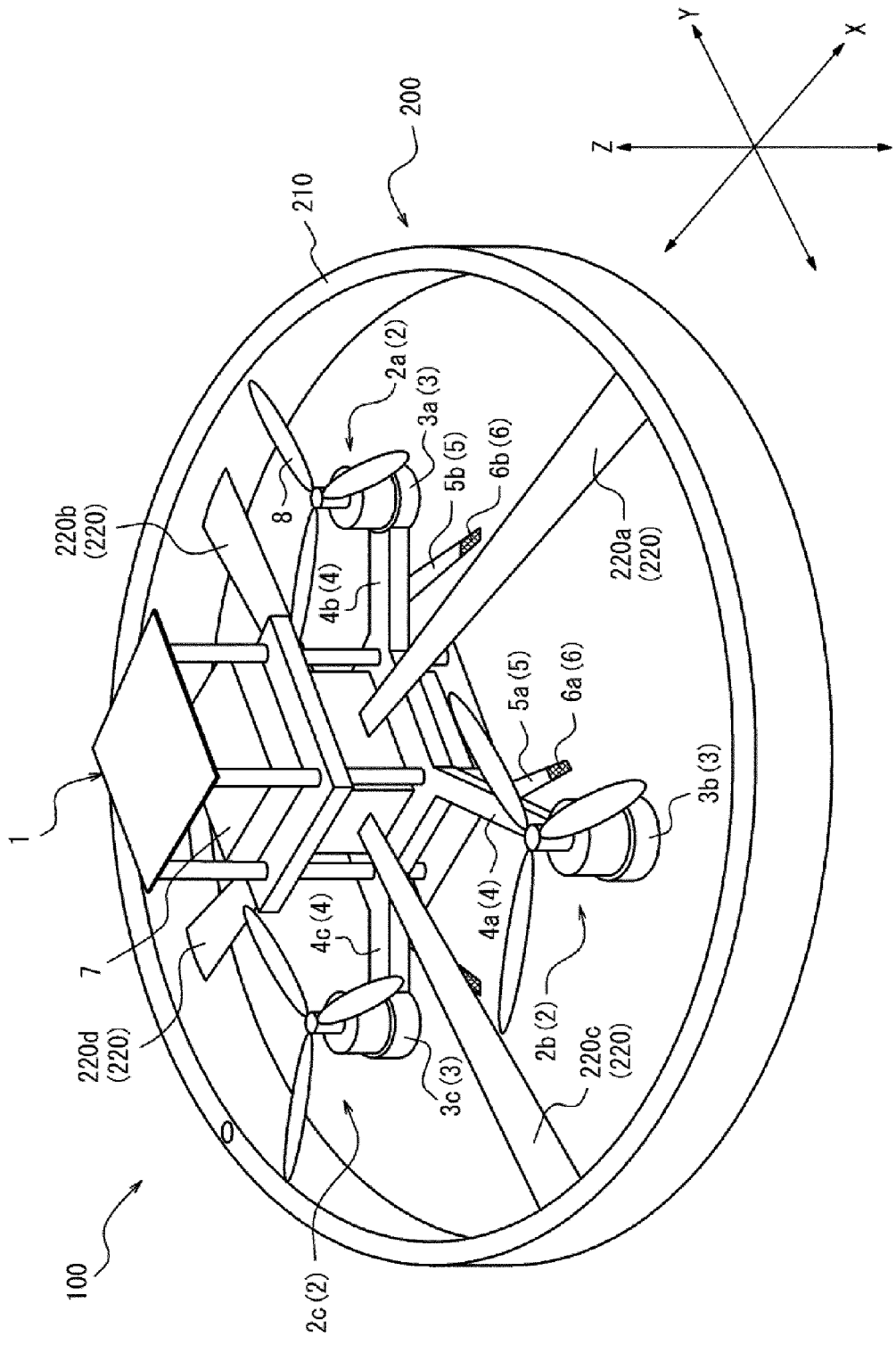
FIG. 1 is a perspective view illustrating an example of a configuration of an unmanned aerial vehicle on which a propeller guard is mounted according to Embodiment 1.

Hereinafter, Embodiment 1 of the present disclosure will be described with reference to the drawings. In the following description, "up" and "down" refer to directions parallel to the Z-axis of coordinate axes illustrated in the drawings, and "horizontal" refers to a direction parallel to the XY-plane of coordinate axes illustrated in the drawings. Note that, while it is assumed that the horizontal direction of an unmanned aerial vehicle 100 in the description is an approximately horizontal direction of the unmanned aerial vehicle 100 when landing, it does not mean that the unmanned aerial vehicle 100 is always in the approximately horizontal direction including when flying and when landing on the water. The unmanned aerial vehicle 100 may deviate from the approximately horizontal direction due to the posture or the like of the unmanned aerial vehicle 100 in operation.

First, a configuration of the unmanned aerial vehicle 100 on which a propeller guard 200 is mounted according to Embodiment 1 of the present disclosure will be described with reference to FIG. 1.

The unmanned aerial vehicle 100 includes a main body part 1, propeller parts 2, motor parts 3, arm parts 4, leg parts 5, a water landing sensor 6, and a control part 7.

The main body part 1 has a rectangular shape in a plan view and is covered by a sheet material made of CFRP (Carbon Fiber Reinforced Plastics), for example. Propeller parts 2a, 2b, 2c, and 2d each include a plurality of blades 8. The propeller parts 2a, 2b, 2c, and 2d rotate by drive of motor parts 3a, 3b, 3c, and 3d attached respectively to the propeller parts 2a, 2b, 2c, and 2d and generate lift. Arm parts 4a, 4b, 4c, and 4d are rod-like supporting members and extend in the horizontal direction to rotatably support the propeller parts 2a, 2b, 2c, and 2d. Leg parts 5a, 5b, 5c, and 5d support the unmanned aerial vehicle 100 as supporting members so as to prevent the unmanned aerial vehicle 100 from falling over during takeoff or landing. In FIG. 1, while not being visible behind the main body part 1, the leg parts 5c and 5d are arranged on the opposite side of the X-axis direction of the leg parts 5a and 5b.

At least one water landing sensor 6 is disposed in the unmanned aerial vehicle 100. The water landing sensor 6 may be disposed on the propeller guard 200. In the present embodiment, the following description will be made assuming that water landing sensors 6a, 6b, 6c, and 6d are individually disposed on the leg parts 5a, 5b, 5c, and 5d, respectively, of the unmanned aerial vehicle 100.

At least two of the water landing sensors 6a, 6b, 6c, and 6d are paired to detect water landing. For example, when the water landing sensor 6a and the water landing sensor 6b are paired, the water landing sensors 6a and 6b each include one sensing electrode. The two sensing electrodes form a pair of electrodes. When the unmanned aerial vehicle 100 lands on the water and both of the sensing electrodes are immersed in water, a minute current flows between these electrodes using water as a medium, and the conduction is detected. In this case, the water landing sensor 6 outputs a water landing signal indicating that the conduction has been detected to the control part 7. Alternatively, each of the water landing sensors 6a to 6d may individually include a pair of sensing electrodes.

Water landing may be detected by using, for example, a water pressure sensor or the like, other than by detecting the electrical conduction in the water.

The control part 7 is a small computer including, for example, Raspberry Pi (registered trademark) or the like and, as will be described below, controls each part of the unmanned aerial vehicle 100 and each part of the propeller guard 200.

Next, a configuration of the propeller guard 200 will be described in detail.

The propeller guard 200 includes an encircling part 210 and connection parts 220.

In the present embodiment, the encircling part 210 has a shape that externally surrounds all the propeller parts 2 of the unmanned aerial vehicle 100. For example, the encircling part 210 may have a height from the upper surface of the blades 8 to approximately the center part of the motor parts 3 so that at least the blades 8 of the propeller parts 2 can be protected. Alternatively, the encircling part 210 may have a height from the upper surface of the blades 8 to the bottom surface of the motor parts 3 so that all the propeller parts 2 can be protected. The overall shape of the encircling part 210 in a plan view may be a perfect circle or an approximate circle such as an ellipse, or any one of a square, an approximate rectangle such as a rectangle, an approximate triangle such as a regular triangle, etc. may also be used depending on the number or arrangement of propeller parts 2. As described above, the encircling part 210 protects the propeller parts 2 by externally surrounding the propeller parts 2 and prevents the propeller parts 2 from making direct contact with surrounding objects and people.

In the present embodiment, the encircling part 210 has a lightweight material having a specific gravity less than that of water. Further, the encircling part 210 may have a hollow structure in which the inside of the encircling part 210 is entirely or partially hollow. As will be described below, this allows the encircling part 210 to function as a float so that, when the unmanned aerial vehicle 100 lands on the water, at least a part of the main body part 1 and the propeller part 2 are maintained above the water. The encircling part 210 may be formed of CFRP, wood, or a foam material, for example.

The connection parts 220 (220a to 220d) are rod-like supporting members that connect the encircling part 210 and the main body part 1 of the unmanned aerial vehicle 100. As illustrated in FIG. 1, one end portion of each of the connection parts 220a, 220b, 220c, and 220d is fixed to approximately the center part of the front, rear, left, or right side surface of the main body part 1. Each of the connection parts 220a, 220b, 220c, and 220d extends between the arm parts 4 in a corresponding one of the four directions, and the other end portion of each of the connection parts 220a, 220b, 220c, and 220d is connected to the inner surface of the inside of the encircling part 210. The number of connection parts 220 is not limited to four as long as the individual connection part 220 is connected to the main body part 1 and can support the encircling part 210. The unmanned aerial vehicle 100 may include any number of two or more connection parts 220 depending on the number of propeller parts 2, arm parts 4, or the like.

Figure 2A:
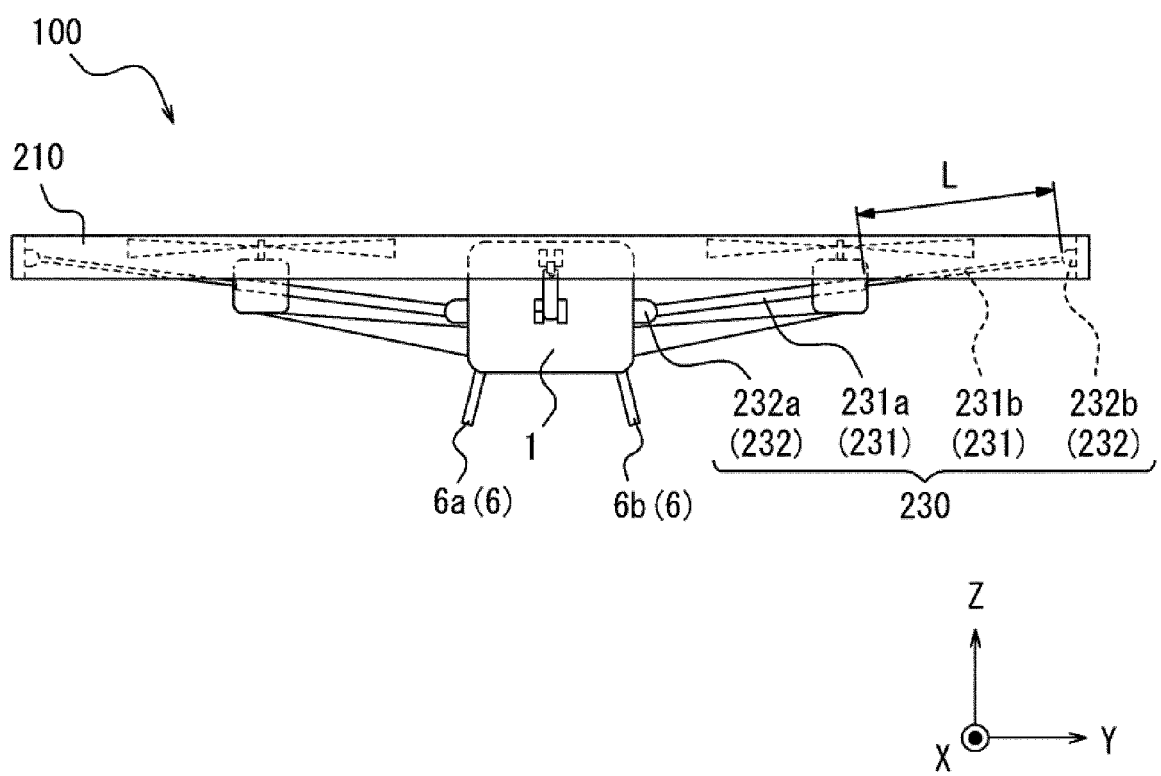
FIG. 2A illustrates a state of the unmanned aerial vehicle on which the propeller guard is mounted while in flight according to Embodiment 1.

As illustrated in FIG. 2A, the individual connection part 220 can include a raising and lowering mechanism 230. The raising and lowering mechanism 230 includes a telescopic mechanism 231 and a hinge part 232. The telescopic mechanism 231 includes a telescopic mechanism outer part 231a on the main body part 1 side and a telescopic mechanism inner part 231b on the encircling part 210 side of the unmanned aerial vehicle 100. The hinge part 232 includes a main body part-side hinge part 232a at an end portion of the telescopic mechanism outer part 231a on the main body part 1 side and further includes an encircling part-side hinge part 232b at an end portion of the telescopic mechanism inner part 231b on the encircling part 210 side. Alternatively, the hinge part 232 may be configured with only either the main body part-side hinge part 232a or the encircling part-side hinge part 232b. This rotatably connects the telescopic mechanism 231 and the encircling part 210 to the main body part 1. The telescopic mechanism inner part 231b is slidably accommodated in the telescopic mechanism outer part 231a in an axial direction. The telescopic mechanism inner part 231b extends outward from an outer end portion of the telescopic mechanism outer part 231a and has a length L along the longitudinal direction of the telescopic mechanism 231.

Figure 2B:
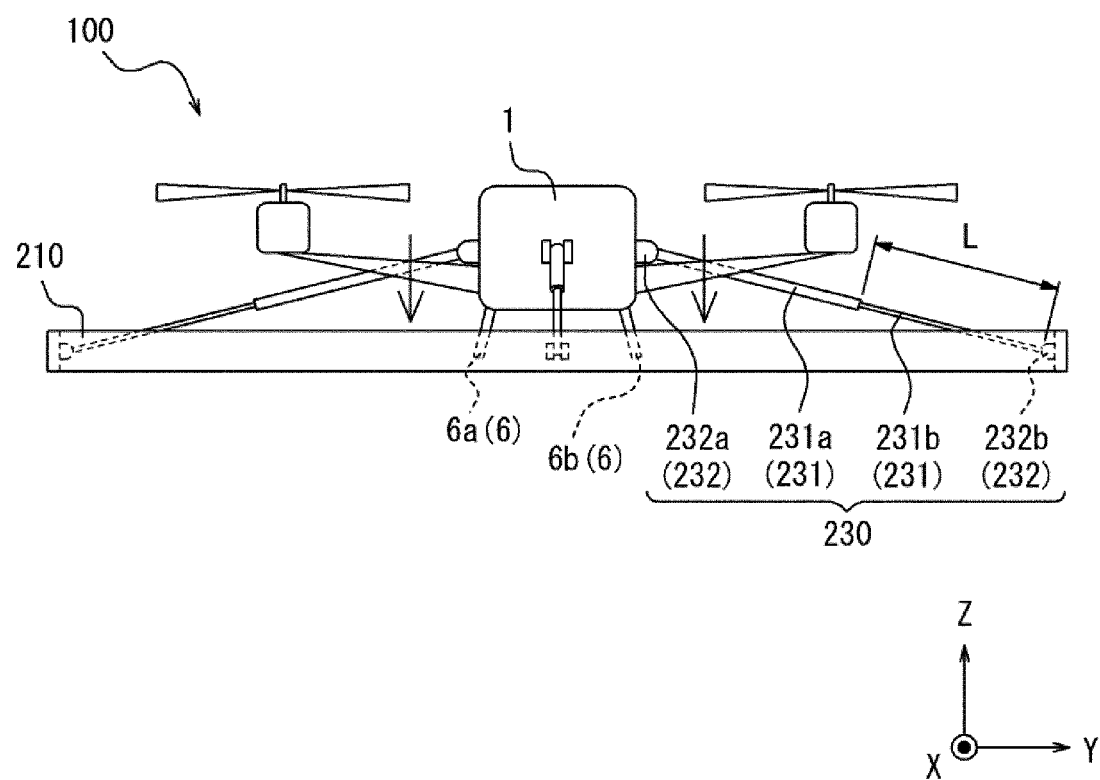
FIG. 2B illustrates a state of the unmanned aerial vehicle on which the propeller guard is mounted when landing on the water according to Embodiment 1.

In the present embodiment, based on a signal from the control part 7, the main body part-side hinge part 232a and the telescopic mechanism 231 can be actuated, for example, by a hydraulic or electromagnetic actuator. By controlling the main body part-side hinge part 232a, the telescopic mechanism 231 is enabled to move up and down about the main body part-side hinge part 232a. In addition, by controlling the telescopic mechanism 231, the telescopic mechanism inner part 231b extends and contracts in a radial direction with respect to the telescopic mechanism outer part 231a. Accordingly, as will be described in detail below, when the unmanned aerial vehicle 100 is in flight (FIG. 2A), the raising and lowering mechanism 230 can raise and maintain the encircling part 210 by causing the telescopic mechanism 231 to rotate upward about the main body part-side hinge part 232a as well as to extend in the radial direction. Further, when the unmanned aerial vehicle 100 lands on the water (FIG. 2B), the raising and lowering mechanism 230 can lower and maintain the encircling part 210 by causing the telescopic mechanism 231 to rotate downward about the main body part-side hinge part 232a as well as to contract in the radial direction. Alternatively, in place of the main body part-side hinge part 232a or together with the main body part-side hinge part 232a, the encircling part-side hinge part 232b may be configured to be actuated by the actuator to vertically raise and lower the encircling part 210. In addition, only the main body part-side hinge part 232a or the encircling part-side hinge part 232b may be driven to operate so as not to actively extend or contract the telescopic mechanism 231.

Next, an operation flow for raising and lowering the propeller guard 200 configured as described above will be described with reference to FIGS. 3A to 3D.

Figure 3A:
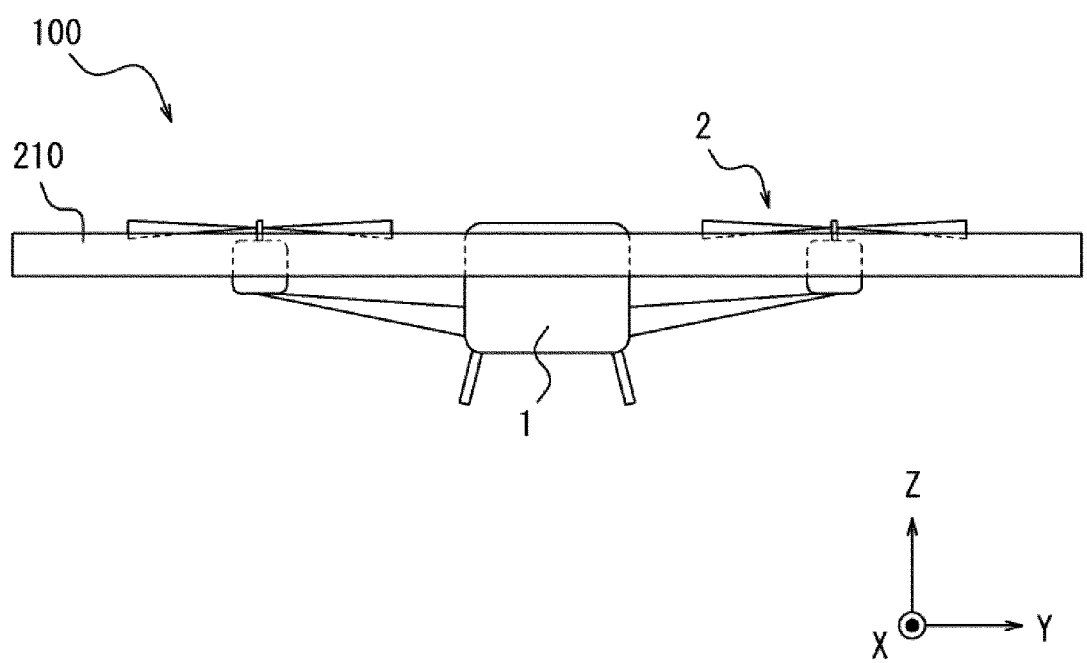
FIG. 3A is a diagram for describing an operation flow during ascent and descent (during flight) of the unmanned aerial vehicle on which the propeller guard is mounted according to Embodiment 1.

First, referring to FIG. 3A, while the unmanned aerial vehicle 100 is in flight, the encircling part 210 of the propeller guard 200 is maintained in a position (hereinafter, referred to as a first position) where the encircling part 210 externally surrounds at least a part of the propeller parts 2 by the raising and lowering mechanism 230 having the telescopic mechanism 231. Specifically, the telescopic mechanism 231 is oriented upward from the main body part 1 in the radially outward direction by the main body part-side hinge part 232a, and the telescopic mechanism inner part 231b extends outward from the telescopic mechanism outer part 231a and is maintained in a state having a length L of the telescopic mechanism 231. As a result, the encircling part 210 functions as a propeller guard that protects the propeller parts 2 while the unmanned aerial vehicle 100 is in flight.

Here, the first position may be a position where the encircling part 210 surrounds only a part of the propeller parts 2, for example, only the blades 8, or only a part of the blade parts 8. Alternatively, the first position may be a position where the encircling part 210 surrounds all the propeller parts 2, for example, both the blades 8 and the motor parts 3.

Figure 3B:
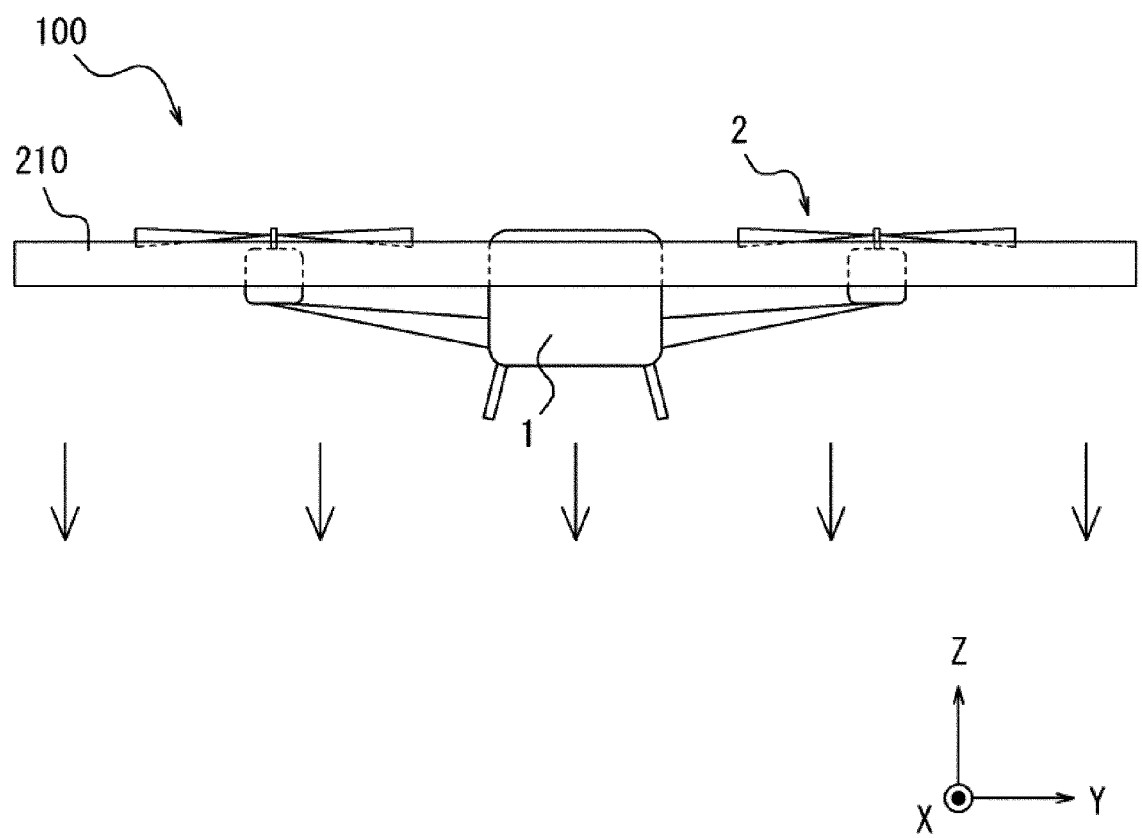
FIG. 3B is a diagram for describing an operation flow during ascent and descent (during descent) of the unmanned aerial vehicle on which the propeller guard is mounted according to Embodiment 1.
Figure 3C:
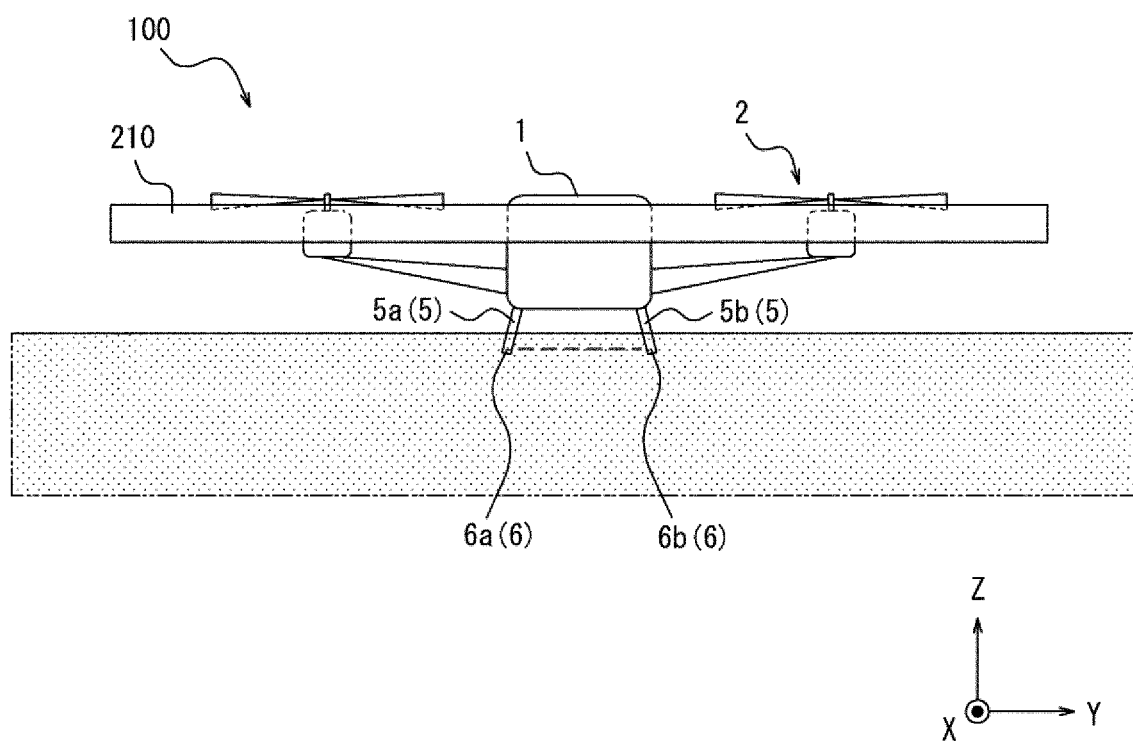
FIG. 3C is a diagram for describing an operation flow during ascent and descent (when checking the landing on the water) of the unmanned aerial vehicle on which the propeller guard is mounted according to Embodiment 1.

Next, referring to FIG. 3B, the unmanned aerial vehicle 100 descends toward the water surface. Next, in FIG. 3C, the leg parts 5 land on the water, and the water landing sensor 6a and the water landing sensor 6b, which are disposed at the bottom portions of the leg part 5a and the leg part 5b, respectively, detect the landing on the water surface. The water landing sensor 6a and the water landing sensor 6b output water landing signals indicating that the water landing has been made to the control part 7. When acquiring the water landing signals from the water landing sensors 6a and 6b, the control part 7 controls and actuates the telescopic mechanism 231 and the hinge part 232 included in the raising and lowering mechanism 230.

Figure 3D:
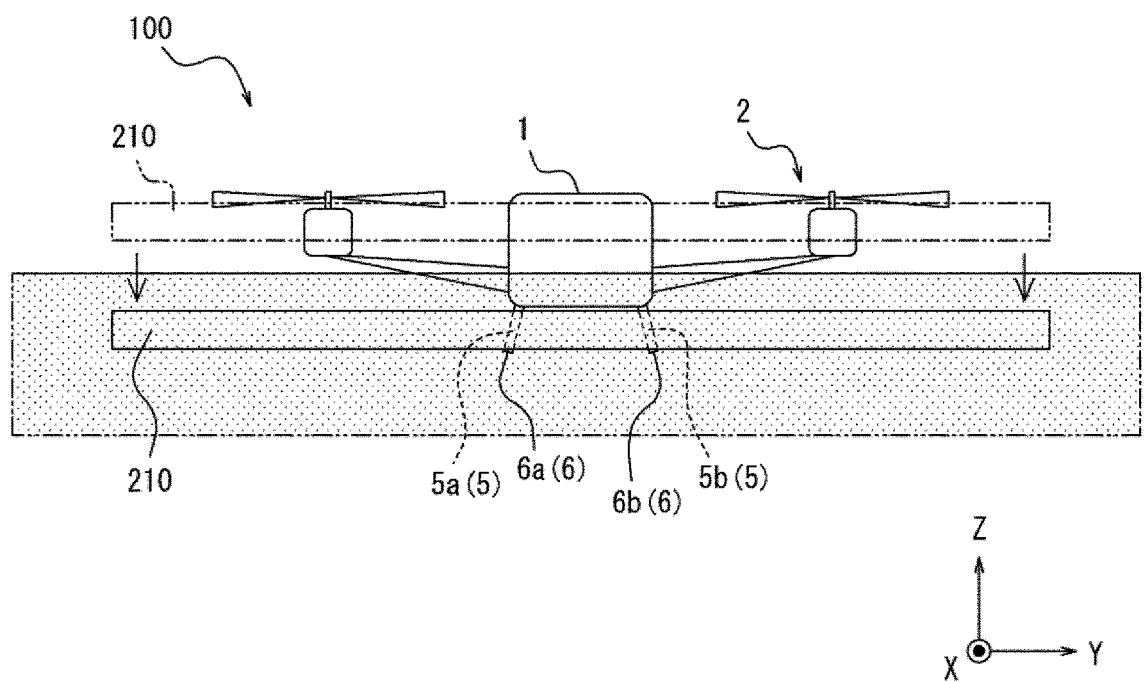
FIG. 3D is a diagram for describing an operation flow during ascent and descent (when landed on the water) of the unmanned aerial vehicle on which the propeller guard is mounted according to Embodiment 1.

As illustrated in FIG. 3D, by the control of the control part 7, the encircling part 210 is lowered from the first position to be maintained in a position (hereinafter, referred to as a second position) where at least a part of the main body part 1 and the propeller parts 2 can be maintained above the water. Specifically, first, the control part 7 causes the telescopic mechanism 231 to rotate downward about the main body part-side hinge part 232a and causes the telescopic mechanism inner part 231b to contract back into the inside of the telescopic mechanism outer part 231a. This lowers the encircling part 210, and the telescopic mechanism 231 is oriented in an approximately horizontal direction and passes through the center part of the main body part 1 in the vertical direction. Further, the control part 7 causes the telescopic mechanism 231 to rotate further downward about the main body part-side hinge part 232a and causes the telescopic mechanism inner part 231b to extend outward from the telescopic mechanism outer part 231a again. The control part 7 maintains the lowered encircling part 210 in the second position. In this way, when the unmanned aerial vehicle 100 lands on the water, the buoyant encircling part 210 serving as a float functions as a float mechanism that prevents the unmanned aerial vehicle 100 from sinking into the water.

The second position may be a position where, for example, a camera (not illustrated) disposed on the main body part 1, the control part 7, etc. are entirely maintained above the water, and the portions below the camera, the control part 7, etc. are maintained in the water. Alternatively, the second position may be a position where all the propeller parts 2 and one part of the main body part 1 are maintained above the water, and the other part of the main body part 1, for example, the portion below approximately the center part of the main body part 1 in a height direction is maintained in the water. Alternatively, the second position may be a position where the main body part 1 and the propeller parts 2 are entirely maintained above the water, and only a part of the leg parts 5 is maintained in the water. Alternatively, the second position may be a position where the leg parts 5, the main body part 1, and the propeller parts 2 are entirely maintained above the water.

When the unmanned aerial vehicle 100 takes off from the water upward from the state illustrated in FIG. 3D, the control part 7 causes the telescopic mechanism 231 and the main body part-side hinge part 232a to raise the encircling part 210 from the second position and maintain in the above-described first position again. Specifically, first, the control part 7 causes the telescopic mechanism 231 to rotate upward about the main body part-side hinge part 232a and causes the telescopic mechanism inner part 231b to contract back into the inside of the telescopic mechanism outer part 231a. This raises the encircling part 210, and the telescopic mechanism 231 is oriented in approximately horizontal direction and passes through the center part of the main body part 1 in the height direction. Further, the control part 7 causes telescopic mechanism 231 to rotate further upward about the main body part-side hinge part 232a and causes the telescopic mechanism inner part 231b to extend outward from the telescopic mechanism outer part 231a again. The control part 7 maintains the raised encircling part 210 in the first position. In this way, when the unmanned aerial vehicle 100 takes off from the water to fly, the encircling part 210 functions as the propeller guard that protects the propeller parts 2 again.

In place of the water landing sensor 6 or in addition to the water landing sensor 6 described above, a water depth sensor (not illustrated) that detects the depth of water may be disposed on the main body part 1 or the leg part 5 of the unmanned aerial vehicle 100. In this case, in the operation flow for raising and lowering the propeller guard 200 described above, the water depth sensor detects a value of water depth from the surface of the water to the bottom of the water (for example, the floor of the manhole) and outputs the water depth value to the control part 7. The control part 7 acquires the water depth value from the water depth sensor and controls the telescopic mechanism 231 and the hinge part 232 based on the acquired water depth value. In this way, if the water depth is less than a certain level, for example, in a case where the water depth is less than a vertical distance from the propeller parts 2 to the leg parts 5 of the unmanned aerial vehicle 100, and the propeller parts 2 are still above the water even if the leg parts 5 reach the bottom of the water, the encircling part 210 can be raised and maintained in the first position. If the water depth is above a certain level, for example, in a case where the water depth is deeper than a vertical distance from the propeller parts 2 to the leg parts 5 of the unmanned aerial vehicle 100, and the propeller parts 2 sink into the water if the leg parts 5 reach the bottom of the water, the encircling part 210 can be lowered and maintained in the second position. In this way, the encircling part 210 functions as the propeller guard at a place with shallow water and functions as the float at a place with deep water.

According to Embodiment 1, there is provided the propeller guard 200 that functions as a propeller guard for protecting surrounding people and objects during flight and that functions as a float mechanism during landing on the water by causing the raising and lowering mechanism 230 to raise and lower the encircling part 210 without installing the propeller guard and the float mechanism separately and independently. Thus, by causing the encircling part 210 of the unmanned aerial vehicle 100 capable of taking off and landing on the water to serve as both the propeller guard, which is not needed during landing on the water, and the float mechanism (float), which is not needed during flight, the weight of the unmanned aerial vehicle 100 is reduced, and the payload can be easily secured.

In addition, according to Embodiment 1, since the raising and lowering mechanism 230 includes the telescopic mechanism 231 and the hinge part 232, the raising and lowering of the encircling part 210 can be performed smoothly. Further, comparing to a case where the above-described raising and lowering operation is not performed, that is, a case where a human performs the raising and lowering operation with a controller, according to Embodiment 1, there is no need to manually perform the raising and lowering operation of the encircling part 210. Thus, operation errors of the unmanned aerial vehicle 100 during takeoff or landing on the water can be prevented. Further, the unmanned aerial vehicle 100 can be more easily maneuvered during takeoff and landing on the water.

Embodiment 2

Figure 4A:
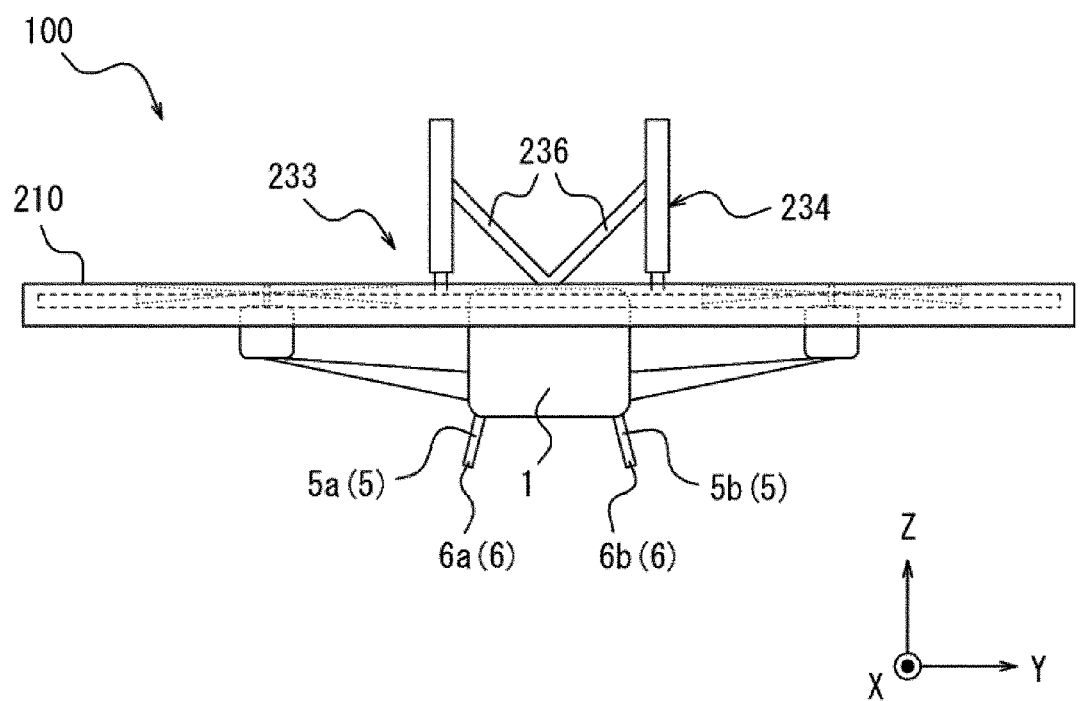
FIG. 4A illustrates a state of an unmanned aerial vehicle on which a propeller guard is mounted while in flight according to Embodiment 2.

In Embodiment 2, a raising and lowering mechanism 230 may be achieved by a telescopic device 233. In this case, as illustrated in FIG. 4A, the telescopic device 233 includes vertical telescopic mechanisms 234 that are connected to a main body part 1 and extends in the vertical direction, horizontal-direction connection parts (connection parts) not illustrated each of which connects the vertical telescopic mechanism 234 and an encircling part 210, and reinforcement parts 236 that are disposed on the main body part 1. In FIG. 4A, while not being visible behind the encircling part 210, the horizontal-direction connection parts are arranged inside the encircling part 210.

At least one pair of the vertical telescopic mechanisms 234 is provided and arranged to sandwich a main body part 1 from the outside. The individual vertical telescopic mechanism 234 is fixed such that the entire vertical telescopic mechanism 234 or a part thereof extends vertically from the upper surface of the main body part 1 by the individual reinforcement part 236 extending diagonally upward from the upper surface of the main body part 1. The individual vertical telescopic mechanism 234 may be fixed by connecting the reinforcement part 236 to approximately the center part of the individual vertical telescopic mechanism 234. The individual vertical telescopic mechanism 234 may have a rod-like shape or a plate-like shape.

Each of the vertical telescopic mechanisms 234 includes a telescopic mechanism outer part 234a and a telescopic mechanism outer part 234b. The telescopic mechanism inner part 234b is slidably accommodated in a telescopic mechanism outer part 234a in an axial direction. The telescopic mechanism inner part 234b extends outward from an outer end portion of the telescopic mechanism outer part 234a and is maintained in a state having a length L along the longitudinal direction of the vertical telescopic mechanism 234.

One end portion of each of the horizontal-direction connection parts (connection parts) not illustrated is fixed to the lower end of the telescopic mechanism inner part 234b and extends between arm parts 4 of the unmanned aerial vehicle 100 in a direction forming an approximately right angle with the telescopic mechanism inner part 234b, and the other end portion is fixed to the inner surface of the encircling part 210. In this way, the individual horizontal-direction connection part connects the telescopic mechanism inner part 234b and the encircling part 210. There may be four horizontal-direction connection parts to correspond to the number of telescopic mechanism inner parts 234b. However, as long as the individual horizontal-direction connection part is connected to the telescopic mechanism inner part 234b and can support the encircling part 210, the number of horizontal-direction connection parts is not limited to four. The unmanned aerial vehicle 100 may include any number of two or more horizontal-direction connection parts depending on the number of propeller parts 2, arm parts 4, or the like.

The vertical telescopic mechanisms 234 can be actuated, for example, by a hydraulic or electromagnetic actuator, based on a signal from the control part 7.

Figure 4B:
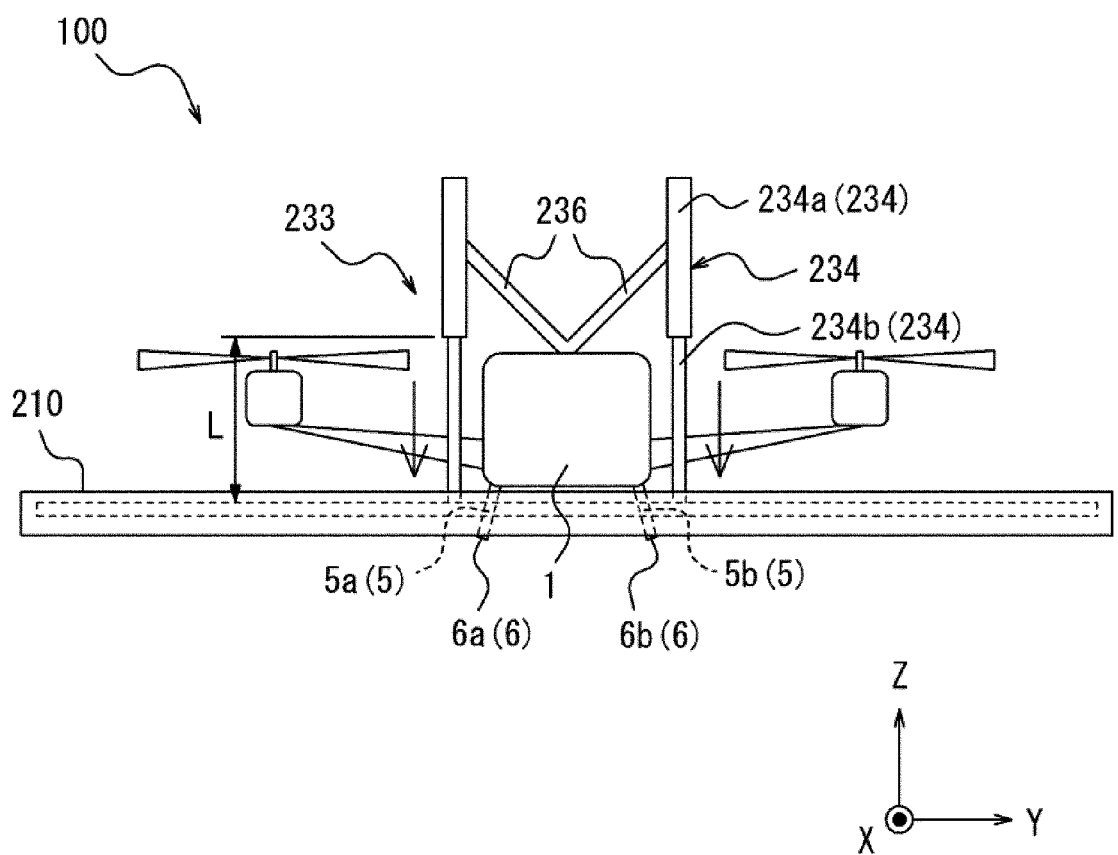
FIG. 4B illustrates a state of the unmanned aerial vehicle on which the propeller guard is mounted when landing on the water according to Embodiment 2.

Referring to FIGS. 4A and 4B, while the unmanned aerial vehicle 100 is in flight (FIG. 4A), the control part 7 causes the vertical telescopic mechanisms 234 to raise and maintain the encircling part 210 in the first position. In this way, the encircling part 210 functions as a propeller guard that protects the propeller parts 2 while the unmanned aerial vehicle 100 is in flight. When the unmanned aerial vehicle 100 lands on the water (FIG. 4B), the encircling part 210 is lowered and maintained in the second position. Specifically, when the unmanned aerial vehicle 100 descends toward the water surface and lands on the water, water landing sensors 6 send water landing signals to the control part 7. When the control part 7 acquires the water landing signals from the water landing sensors 6a and 6b, the control part 7 causes the vertical telescopic mechanisms 234 to operate. Next, the control part 7 causes the telescopic mechanism inner part 234b to extend downward from the telescopic mechanism outer part 234a and maintains a state having a length L of the telescopic mechanism 233. This operation of the vertical telescopic mechanism 234 lowers the encircling part 210, and the encircling part 210 functions as a float mechanism that prevents the unmanned aerial vehicle 100 from sinking into the water.

When the unmanned aerial vehicle 100 takes off from the water, the control part 7 causes the encircling part 210 to be raised and maintained in the first position again. Specifically, the control part 7 causes the individual vertical telescopic mechanism 234 to operate to slide the telescopic mechanism inner part 234b back into the telescopic mechanism outer part 234a so that the vertical telescopic mechanism 234 is shortened. This raises the encircling part 210, and the encircling part 210 functions as the propeller guard that protects the propeller parts 2 again.

According to Embodiment 2, there is provided the propeller guard that functions as a propeller guard for protecting surrounding people and objects during flight and that functions as a float mechanism during landing on the water by causing the vertical telescopic mechanisms 234 to raise and lower the encircling part 210 without installing the propeller guard and the float mechanism separately and independently. Thus, by causing the encircling part 210 of the unmanned aerial vehicle 100 capable of taking off and landing on the water to serve as both the propeller guard, which is not needed during landing on the water, and the float mechanism (float), which is not needed during flight, the weight of the unmanned aerial vehicle 100 is reduced, and the payload can be easily secured.

In addition, according to Embodiment 2, since the raising and lowering of the encircling part 210 can be performed only with the telescopic mechanism without using hinge parts, a more simply structured and lighter propeller guard can be achieved.

Embodiment 3

Figure 5A:
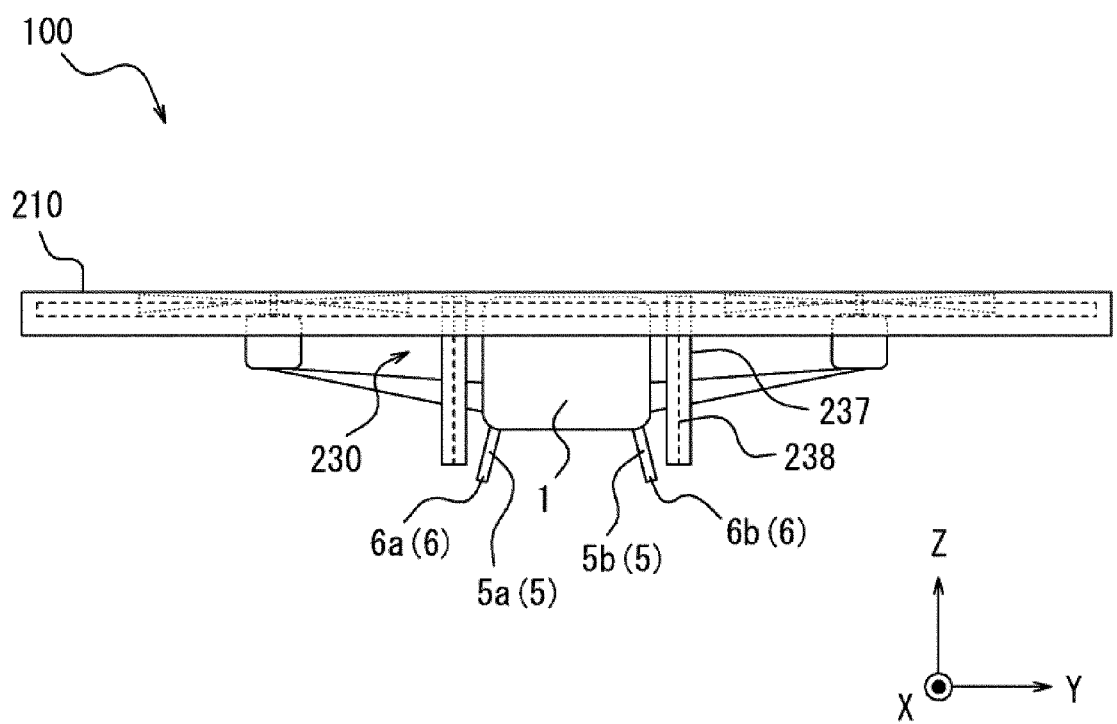
FIG. 5A illustrates a state of an unmanned aerial vehicle on which a propeller guard is mounted while in flight according to Embodiment 3.

In Embodiment 3, a raising and lowering mechanism 230 may be achieved by a raising and lowering mechanism using a chain member. In this case, as illustrated in FIG. 5A, the raising and lowering mechanism 230 includes vertical guide parts 237 that are connected to a main body part 1 and extend in the vertical direction, chain members 238, sprockets (not illustrated), and horizontal-direction connection parts (connection parts) not illustrated that are driven in the vertical direction by the chain members 238 connected to an encircling part 210. In FIG. 5A, while not being visible behind the encircling part 210, the horizontal-direction connection parts are arranged inside the encircling part 210.

At least one pair of the vertical guide parts 237 is provided, and the vertical guide parts 237 are arranged to sandwich the main body part 1 from the outside. The vertical guide parts 237 guide the horizontal-direction connection parts in the vertical direction by using rollers or the like disposed on the horizontal-direction connection parts. At least a part of the individual vertical guide part 237 is fixed to the outside of the main body part 1. The individual vertical guide part 237 may have a rod-like shape or a plate-like shape.

The individual chain member 238 is arranged along the vertical guide part 237. The individual sprocket (not illustrated) may be arranged at the upper portion of the vertical guide part 237, for example. Other than the chain member 238 such as a roller chain, any type of cord-like member such as a wire or a belt may be used to drive the horizontal-direction connection part. For ease of viewing, in FIGS. 5A and 5B, the chain members 238 are represented by dashed lines.

The individual horizontal-direction connection part (connection part) not illustrated is provided with the roller or the like on one end portion thereof and movably guided in the vertical direction by the vertical guide part 237. The individual horizontal-direction connection part extends outward between arm parts 4 of an unmanned aerial vehicle 100, and the other end portion is fixed to the inner surface of the encircling part 210. In this way, the horizontal-direction connection parts are vertically driven by the chain members 238 while being movably guided in the vertical direction by the vertical guide parts 237. There may be four horizontal-direction connection parts to correspond to the number of chain members 238. However, as long as the individual horizontal-direction connection part is connected to the chain member 238 and can support the encircling part 210, the number of horizontal-direction connection parts is not limited to four. The unmanned aerial vehicle 100 may include any number of two or more horizontal-direction connection parts depending on the number of propeller parts 2, arm parts 4, or the like.

Based on a signal from a control part 7, a hydraulic or electromagnetic actuator not illustrated rotates the sprockets engaged with the chain members 238, and this moves the chain members 238 along the vertical guide parts 237 so that the horizontal-direction connection parts and the encircling part 210 connected to the chain members 238 can move up and down.

Figure 5B:
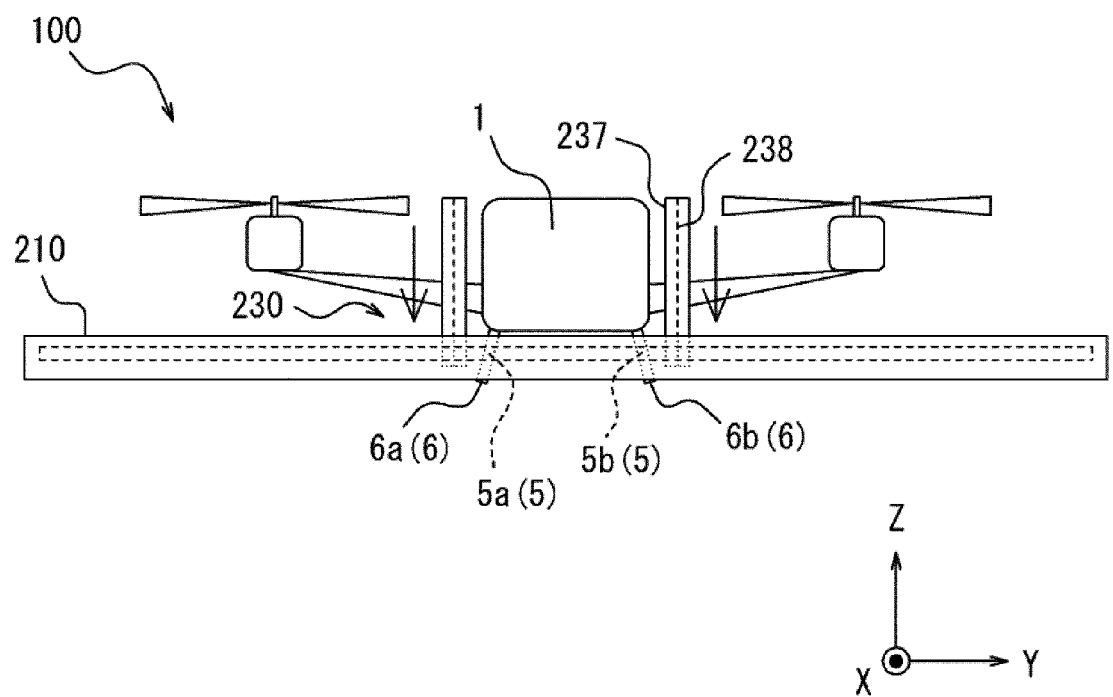
FIG. 5B illustrates a state of the unmanned aerial vehicle on which the propeller guard is mounted when landing on the water according to Embodiment 3.

Referring to FIGS. 5A and 5B, while the unmanned aerial vehicle 100 is in flight (FIG. 5A), by controlling the sprockets engaged with the chain members 238, the control part 7 causes the chain members 238 to move to raise and maintain the encircling part 210 in the first position. In this way, while the unmanned aerial vehicle 100 is in flight, the encircling part 210 functions as a propeller guard that protects propeller parts 2. When the unmanned aerial vehicle 100 lands on the water (FIG. 5B), the encircling part 210 is lowered and maintained in the second position. Specifically, when the unmanned aerial vehicle 100 descends toward the water surface and lands on the water, water landing signals are sent from water landing sensors 6 to the control part 7. When the control part 7 acquires the water landing signals from water landing sensors 6a and 6b, the control part 7 causes the sprockets to operate. When the control part 7 causes the chain members 238 to move downward along the vertical guide parts 237 via the sprockets, the horizontal-direction connection parts and the encircling part 210 connected to the chain members 238 are lowered. Thus, the encircling part 210 functions as a float mechanism that prevents the unmanned aerial vehicle 100 from sinking into the water.

When the unmanned aerial vehicle 100 takes off from the water, the control part 7 causes the encircling part 210 to be raised and maintained in the first position again. Specifically, by controlling the sprockets engaged with the chain members 238, the control part 7 causes the chain members 238 to move upward so that the horizontal-direction connection parts and the encircling part 210 connected to the chain members 238 are raised. Thus, the raised encircling part 210 functions as the propeller guard that protects the propeller parts 2 again.

According to Embodiment 3, there is provided the propeller guard that functions as a propeller guard for protecting surrounding people and objects during flight and that functions as a float mechanism during landing on the water by causing the raising and lowering mechanism 230 using the chain members 238 to raise and lower the encircling part 210 without installing the propeller guard and the float mechanism separately and independently. Thus, by causing the encircling part 210 of the unmanned aerial vehicle 100 capable of taking off and landing on the water to serve as both the propeller guard, which is not needed during landing on the water, and the float mechanism (float), which is not needed during flight, the weight of the unmanned aerial vehicle 100 is reduced, and the payload can be easily secured.

In addition, according to Embodiment 3, since the raising and lowering of the encircling part can be performed without using hinge parts and a telescopic mechanism, a more simply structured and lighter propeller guard can be achieved.

Embodiment 4

Figure 6A:
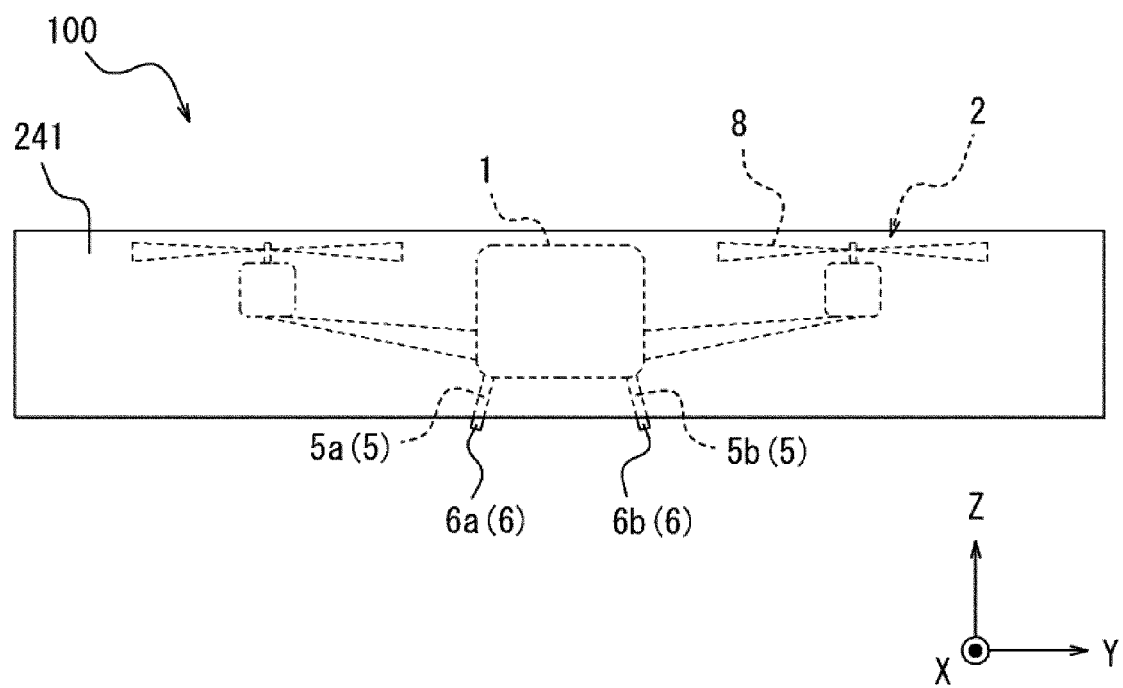
FIG. 6A illustrates a state of an unmanned aerial vehicle on which a propeller guard is mounted while in flight according to Embodiment 4.

In Embodiment 4, the function as a propeller guard that protects propeller parts 2 and the function as a float mechanism on the water may be achieved by using a propeller guard 200 including an encircling part 210 extending from a height of the propeller parts 2 to at least a height of the bottom surface of a main body part 1, without including a raising and lowering mechanism 230. In this case, as illustrated in FIG. 6A, a propeller guard according to Embodiment 4 includes an encircling part 241 and horizontal-direction connection parts (connection parts) not illustrated. In FIG. 6A, while not being visible behind the encircling part 241, the horizontal-direction connection parts are arranged inside the encircling part 241.

The encircling part 241 has a shape that externally surrounds all the propeller parts 2 of an unmanned aerial vehicle 100. The encircling part 241 may have a height from a height equal to or higher than the upper end portion of blades 8 to a height lower than approximately the center part of leg parts 5 and higher than the bottom surface of the leg parts 5 so that the entire unmanned aerial vehicle 100 including the propeller parts 2, the main body part 1, and a part of the leg parts 5 can be protected. The overall shape of the encircling part 241 in a plan view may be a perfect circle or an approximate circle such as an ellipse, or any one of a square, an approximate rectangle such as a rectangle, an approximate triangle such as a regular triangle, etc. may also be used depending on the number or arrangement of propeller parts 2.

The encircling part 241 has a lightweight material having a specific gravity less than that of water. The encircling part 241 may have a hollow structure in which the inside of the encircling part 241 is entirely or partially hollow. This allows at least a part of the main body part 1 and the propeller parts 2 to be maintained above the water when the unmanned aerial vehicle 100 lands on the water. The encircling part 241 may be formed of CFRP, wood, or a foam material, for example.

One end portion of each of a total of four horizontal-direction connection parts (connection parts) is fixed to the front, rear, left, or right side surface of the main body part 1 of the unmanned aerial vehicle 100 and extends between arm parts 4 of the unmanned aerial vehicle 100 in a direction forming an approximately right angle with the side surface of the main body part, and the other end portion is fixed to the inner surface of the encircling part 241. In this way, the individual horizontal-direction connection part connects the main body part 1 and the encircling part 241. The number of horizontal-direction connection parts is not limited to four as long as the individual horizontal-direction connection part is connected to the main body part 1 and can support the encircling part 241. The unmanned aerial vehicle 100 may include any number of two or more horizontal-direction connection parts depending on the number of propeller parts 2, arm parts 4, or the like.

Figure 6B:
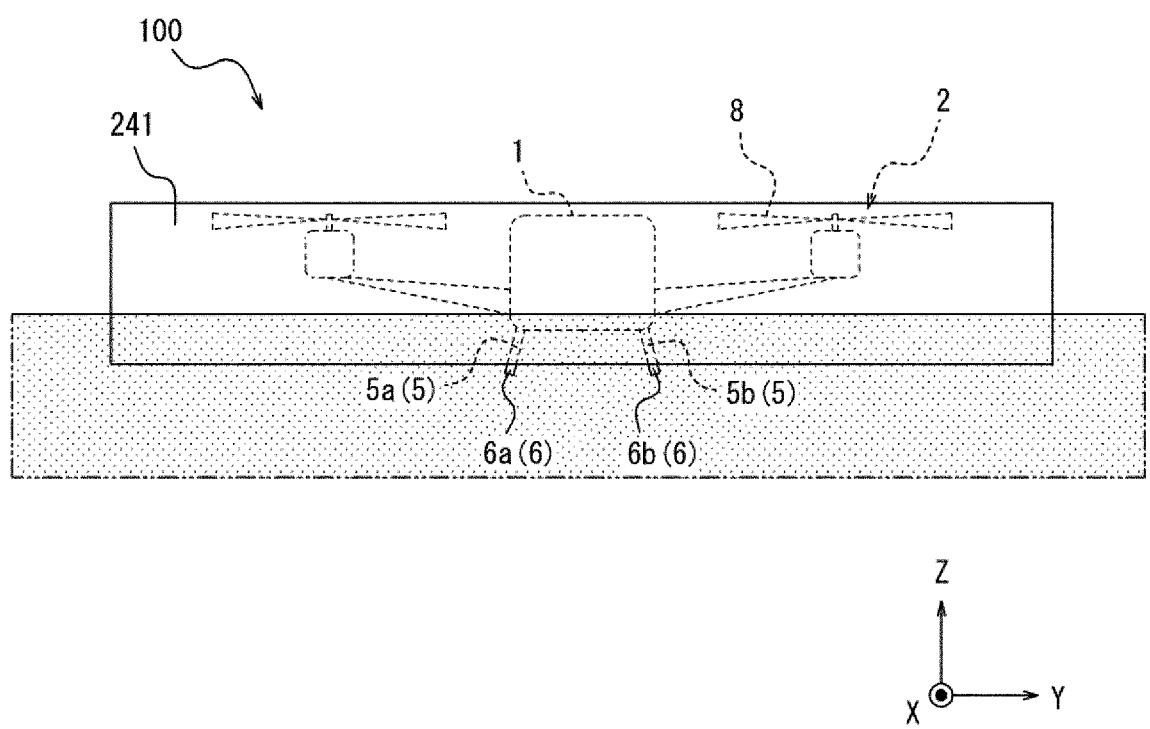
FIG. 6B illustrates a state of the unmanned aerial vehicle on which the propeller guard is mounted when landing on the water according to Embodiment 4.

Referring to FIGS. 6A and 6B, while the unmanned aerial vehicle 100 is in flight (FIG. 6A), the encircling part 241 functions as a propeller guard that protects the propeller parts 2. When the unmanned aerial vehicle 100 lands on the water (FIG. 6B), the encircling part 241 serving as a float functions as a float mechanism that prevents the unmanned aerial vehicle 100 from sinking into the water.

When the unmanned aerial vehicle 100 takes off from the water, the encircling part 241 functions as the propeller guard that protects the propeller parts 2 again.

According to Embodiment 4, a propeller guard in which the propeller guard is integrated with a float mechanism is provided. Accordingly, there is provided the propeller guard that functions as a propeller guard for protecting surrounding people and objects during flight and that functions as a float mechanism during landing on the water without installing the propeller guard and the float mechanism separately and independently. Thus, by causing the encircling part 241 of the unmanned aerial vehicle capable of taking off and landing on the water to serve as both the propeller guard, which is not needed during landing on the water, and the float mechanism (float), which is not needed during flight, the weight of the unmanned aerial vehicle 100 is reduced, and the payload can be easily secured.

In addition, according to Embodiment 4, the operation is facilitated by saving time and labor for manually performing the raising and lowering operation using the raising and lowering mechanism during takeoff and landing on the water. Further, since there is no need to detect that the water landing has been made when the unmanned aerial vehicle 100 lands on the water, installation of sensors or the like associated with the detection can be eliminated.

While the above embodiments have been described as representative examples, it will be apparent to those skilled in the art that various changes and substitutions may be made within the spirit and scope of the present disclosure. Accordingly, the present disclosure should not be construed as being limited to the embodiments described above, and various modifications and changes may be made without departing from the scope of the claims.

For example, in the present embodiment, a single encircling part 241 surrounding all the four propeller parts 2 from the outside is provided. However, the present disclosure is not limited to this mode. The encircling part 241 may be configured to surround the individual propeller part 2 from the outside.

In addition, in the present embodiment, the water landing sensor 6 detects the water landing of the unmanned aerial vehicle 100. However, the present disclosure is not limited to this mode. For example, the control part 7 may be configured to detect the water landing based on an image obtained by a 6 or location information obtained by GPS (Global Positioning System).

REFERENCE SIGNS LIST

1 Main body part
2, 2a, 2b, 2c, 2d Propeller part
3, 3a, 3b, 3c, 3d Motor part
4, 4a, 4b, 4c, 4d Arm part
5, 5a, 5b, 5c, 5d Leg part
6, 6a, 6b Water landing sensor
7 Control part
8 Blade
100 Unmanned aerial vehicle
200 Propeller guard
210 Encircling part
220, 220a, 220b, 220c, 220d Connection part
230 Raising and lowering mechanism
231 Telescopic mechanism
231a Telescopic mechanism outer part
231b Telescopic mechanism inner part
232 Hinge part
232a Main body part-side hinge part
232b Encircling part-side hinge part
233 Telescopic device
234 Vertical telescopic mechanism
234a Telescopic mechanism outer part
234b Telescopic mechanism inner part
236 Reinforcement part
237 Vertical guide part
238 Chain
241 Encircling part

The invention claimed is:

1. A propeller guard for an unmanned aerial vehicle including a main body part and a propeller part, the propeller guard comprising:
an encircling part that extends around the propeller part and protects the propeller part; and
a connection part that connects the main body part and the encircling part,
wherein:
the encircling part has a buoyant force for maintaining at least a part of the main body part and the propeller part above water,
the connection part has a raising and lowering mechanism, and
the raising and lowering mechanism moves the encircling part to a first position where the encircling part externally surrounds at least a part of the propeller part when the unmanned aerial vehicle is in flight and lowers the encircling part from the first position to a second position where at least a part of the main body part and the propeller part is maintainable above water when the unmanned aerial vehicle lands on water.

2. The propeller guard according to claim 1, wherein; the encircling part includes a material having a specific gravity less than that of water.

3. The propeller guard according to claim 1, wherein; the raising and lowering mechanism includes a telescopic mechanism.

4. The propeller guard according to claim 1, wherein; the raising and lowering mechanism includes a chain.

5. The propeller guard according to claim 1, wherein: the encircling part extends from a height of the propeller part to at least a height of a bottom surface of the main body part of the unmanned aerial vehicle.

6. An unmanned aerial vehicle comprising:
a propeller guard according to claim 1; and
a water landing sensor that is disposed on a lower portion of the main body part and detects that the main body part comes into contact with a water surface.

7. The unmanned aerial vehicle according to claim 6, wherein;
the water landing sensor performs a detection by detecting electrical conduction in water.

8. A vehicle, comprising:
a main body;
a propeller; and
a propeller guard including:
an encircling structure that extends around the propeller and protects the propeller;
a connection that connects the main body and the encircling structure; and
an actuator to raise and lower the encircling structure,
wherein:
the encircling structure has a buoyant force for maintaining at least a part of the main body and the propeller above water, and
the actuator moves the encircling structure to a first position where the encircling structure externally surrounds at least a part of the propeller when the vehicle is in flight and lowers the encircling structure from the first position to a second position where at least a part of the main body and the propeller is maintainable above water when the vehicle lands on water.

9. The vehicle according to claim 8, wherein:
the encircling structure includes a material having a specific gravity less than that of water.

10. The vehicle according to claim 8, further comprising:
a telescopic support connected to the actuator and the encircling structure which telescopes when the actuator moves.

11. The vehicle according to claim 8, further comprising:
a chain connected to the actuator.

12. The vehicle according to claim 8, wherein:
the encircling structure extends from a height of the propeller to at least a height of a bottom surface of the main body of the aerial vehicle.

13. The vehicle according to claim 8, further comprising:
a propeller guard according to claim 1; and
a water landing sensor that is disposed on a lower portion of the main body and detects that the main body comes into contact with a water surface.

14. The vehicle according to claim 13, wherein:
the water landing sensor performs a detection by detecting electrical conduction in water.

* * * * *